March 2, 1971  A. C. ADAMS ET AL  3,566,654
COILING APPARATUS

Filed Feb. 20, 1968  10 Sheets-Sheet 1

Fig. 1.

INVENTORS
ALBERT C. ADAMS
JOHN J. CROSBY
GEORGE W. GRAF
BY
Robert S. Dunham
ATTORNEY

United States Patent Office 3,566,654
Patented Mar. 2, 1971

3,566,654
COILING APPARATUS
Albert C. Adams, Flushing, John J. Crosby, Cambria Heights, and George W. Graf, Springfield Gardens, N.Y., assignors to Republic Steel Corporation, Cleveland, Ohio
Filed Feb. 20, 1968, Ser. No. 706,850
Int. Cl. B21d 11/06
U.S. Cl. 72—135      21 Claims

ABSTRACT OF THE DISCLOSURE

Apparatus for forming a uniform coil of strip material such as tubing. A bending station bends the strip (supplied continuously thereto) to a desired radius. A plurality of relatively small diameter bending rolls are employed midway between and on the opposite side of the strip from two bending rolls of larger diameter. The strip passes from the bending rolls to a spool which is reciprocated past the plane of the bending station to wrap successive turns and layers of a coil on the spool as the spool is rotated. The reciprocating movement of the spool may be intermittent, i.e., in discrete steps, and may be given a measured delay at the top and bottom positions of the spool to position the turns of each layer opposite the adjacent turns of the next inside layer on the coil. The axis of the spool is movable toward and away from the bending station, and one of the bending rolls is adjustable in accordance with the movement of the spool axis away from the bending station as a coil is built up on the spool so as to automatically increase the radius of bending as the coil diameter increases. An hydraulic valving mechanism is employed having concentric sleeves which include passages therein which when aligned pass fluid therethrough to communicate the cylinder with a fluid supply and discharge system. One of the sleeves is actuated as the strip is coiled on the spool, while the other sleeve is actuated by the reciprocating movement of the spool. The passages in the sleeves are thus intermittently aligned and then nonaligned so as to provide for the intermittent communication of the cylinder through the sleeves with the fluid supply and discharge system. Guide rolls may be employed to support the strip, including rolls adjacent the spool to contain the coil formed on the spool. Of these latter guide rolls, the upper ones may be made pivotable to swing inside the coil to permit the coil to be easily removed from the spool.

BACKGROUND OF THE INVENTION

This invention relates to apparatus for coiling a strip of material. As used heerin, the term "strip" is intended to mean any elongated material to be wound in a coil, such as wire, rod, bar, tubing and the like. The invention is particularly directed to the coiling of a ductile material having a high modulus of elasticity such that the strip must be preformed or bent before coiling to prevent the turns in a layer in a coil from springing outwardly. Also it is particularly directed to the forming of a multi-layer uniform coil. The invention has particular application to the coiling of steel tubing, uncoated or plastic coated steel tubing, e.g., although it is not limited to this specific application. Hitherto, no apparatus has been available capable of winding high-strength, non-flexible material in tight, non-expanding multi-layer coils.

Strip material must be coiled for various reasons. As an example, plastic coated steel tubing used as underground gas conduit is required to be coiled in uniform coils meeting preestablished specifications as to coil diameter, number of turns in a layer and the like, in order to be handled by equipment which lays the tubing in the ground in the building of a gas line. Difficulties are encountered in forming a multi-layer uniform coil of steel tubing. Specifically, the tubing must be preformed or bent prior to coiling so that the turns in a layer of the coil do not spring outwardly. Typical prior art bending rolls cannot be employed for this bending in the forming of a multi-layer coil since they would spring out the coil and undo the preforming as the various layers are formed. The present invention is therefore directed to apparatus for providing a uniform multi-layer coil of strip material.

It is recognized that as a coil of strip material is made, the bending of the strip to facilitate the winding of the strip on a coiling spool should be varied. As the number of layers in the coil builds up, the outside diameter of the coil increases. The prior art has sugegsted a number of techniques for changing the bending radius. Most have proceeded on some timed basis and are suitable as long as the coiling of the strip is taking place at a given, unchanging rate and the strip material is not changing in size, for example, changing in diameter. If the strip material is not supplied at a constant rate, or if the strip material changes in size, it is necessary to change the automatic adjustment mechanism suggested in the prior art to accommodate these changes. See, for example, U.S. patents to Dallas (No. 1,871,665), Meert (No. 3,243,981) and Smith, Jr. et al. (No. 3,337,154), representative of prior art automatic coiling adjustment mechanisms.

In distinction, the present invention provides for the automatic adjustment of bending radius in accordance with the outer diameter of the coil on the spool. As the layers in the coil increase, and hence the outer diameter increases, the bending radius is increased. Thus the rate at which the strip is being supplied for coiling and the size of the strip material do not figure into the adjustment mechanism.

Additionally, the invention provides for the relative reciprocation of the spool upon which the coil is wound and a supply station, such as the bending station at which bending of the strip takes place. The reciprocation is advantageously achieved by moving the spool vertically. Reciprocation is intermittent, i.e., in discrete steps. There is a measured delay provided between steps when the top and bottom turns of each layer in the coil are being formed so that they are positioned adjacent the top and bottom turns of the next inside layer. This delay, taking place when the movement of the spool changes directions, provides for a uniform, well wrapped coil.

Additionally, an hydraulic valve mechanism is employed to achieve the step-type reciprocation of the spool. In particular, concentric sleeves are employed having passages therein which communicate with a cylinder controlling the reciprocating movement of the spol. One of the sleeves is driven in by a motive source, e.g., the motor rotating the spool to cause the strip to be wrapped on the spool. The other sleeve is actuated in accordance with the reciprocating movement of the spool. In this fashion, when the passages are aligned, the cylinder is placed in communication with a fluid supply and discharge conduit which either raises or lowers the spool, as the case may be. As the spool moves, the associated sleeve in the valving mechanism is actuated causing the passages of the sleeves to be nonaligned, thereby cutting off communication of the cylinder with the fluid supply and discharge system and preventing further movement of the spool. The other sleeve, being continuously driven, ultimately moves so that the passages are again aligned and the process repeats itself.

Accordingly, an object of the invention is to provide for the coiling of strip material.

A further object of the invention is to provide for the coiling of strip material in which the bending of the strip prior to the coiling of the strip on a spool is changed in accordance with the diameter of the coil on the spool.

A further object of the invention is to provide for the information of a uniform coil of strip material.

BRIEF DESCRIPTION OF THE DRAWINGS

The invention is representatively embodied in apparatus for coiling tubing, which is illustrated in the accompanying drawings, in which:

FIG. 8 is essentially an enlarged detail or part of the apparatus shown in FIG. 5.

The figures are to various scales.

DETAILED DESCRIPTION

As noted above, the invention is representatively embodied in apparatus for coiling tubing. The invention is applicable to the coiling of any strip material, of which tubing is but one example.

U.S. Pat. No. 3,278,330, issued Oct. 11, 1966, discloses a method and apparatus for coating tubing. As disclosed in that patent, the coated tubing is guided into a tube receiving drum in which a randomly wrapped coil is formed. The term "randomly wrapped" is employed herein to indicate that no attempt is made to form a uniform coil, and the turns within the drum overlap each other in any fashion. The coil within the drum is not suitable for shipment to a user who requires a uniform coil. The present invention is eminently suitable for coiling randomly wrapped coils of coated tubing as produced in accordance with the present just referred to.

Figure 1:
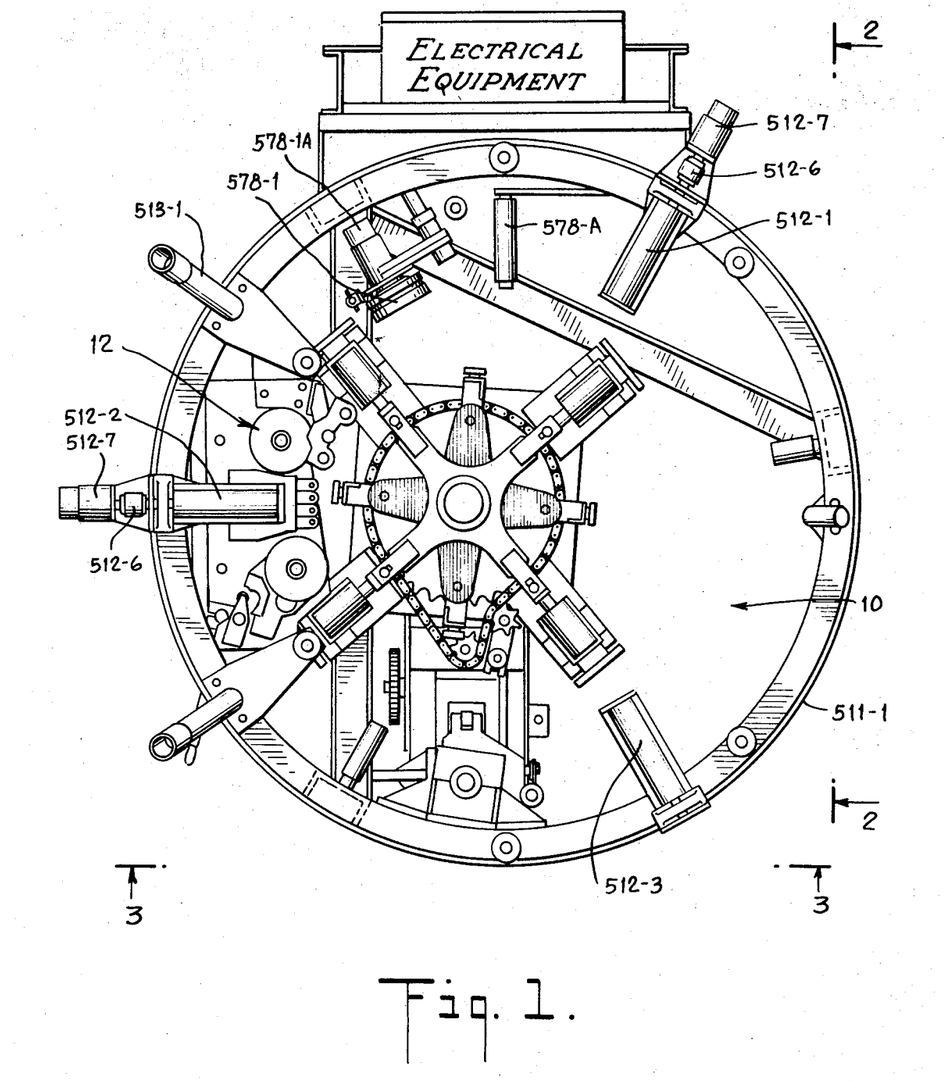
FIG. 1 is a plan view of coiling apparatus.
Figure 2:
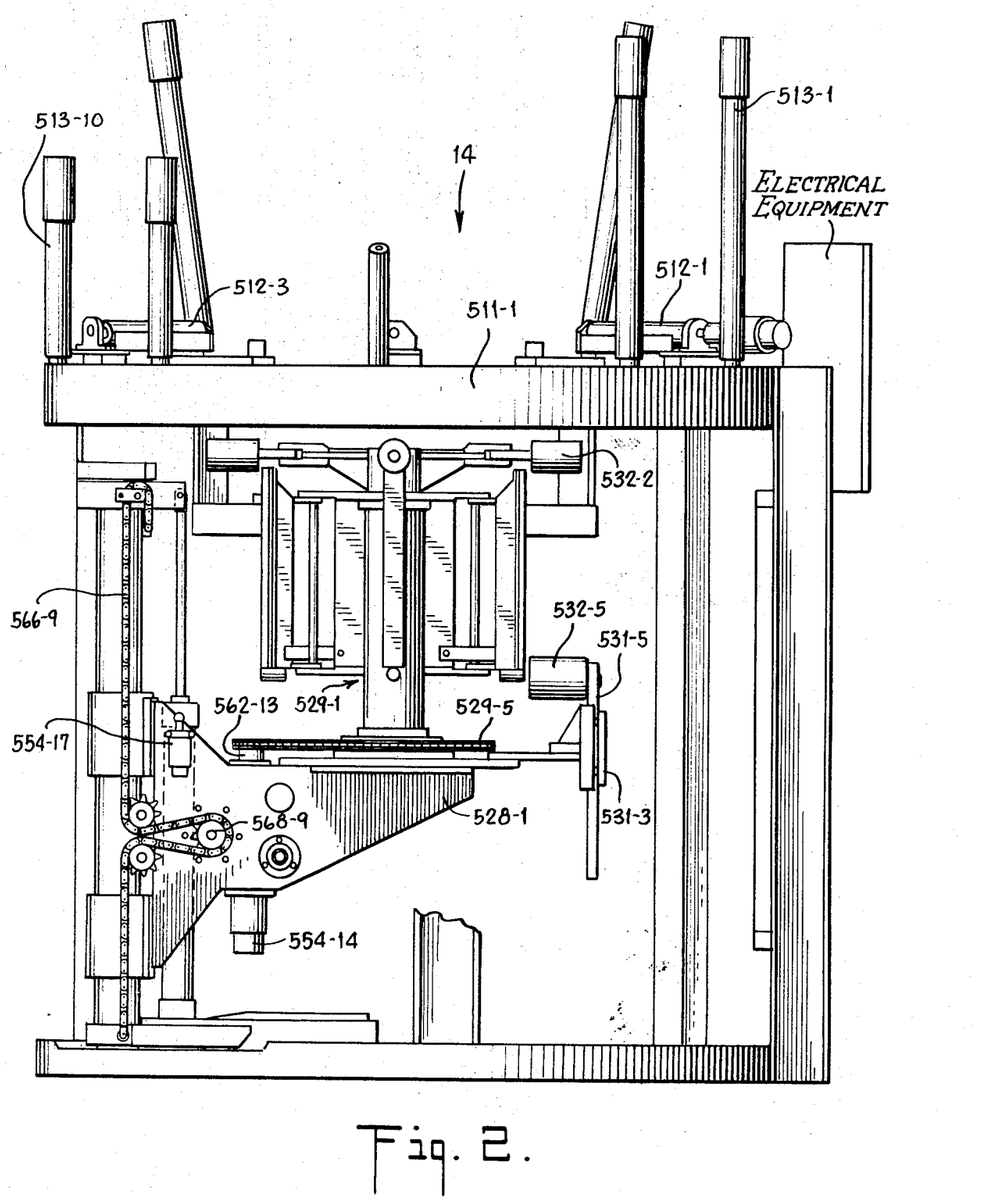
FIGS. 2 and 3 are side views of the apparatus of FIG. 1 looking in the direction of the arrows 2—2 and 3—3 of FIG. 1.
Figure 3:
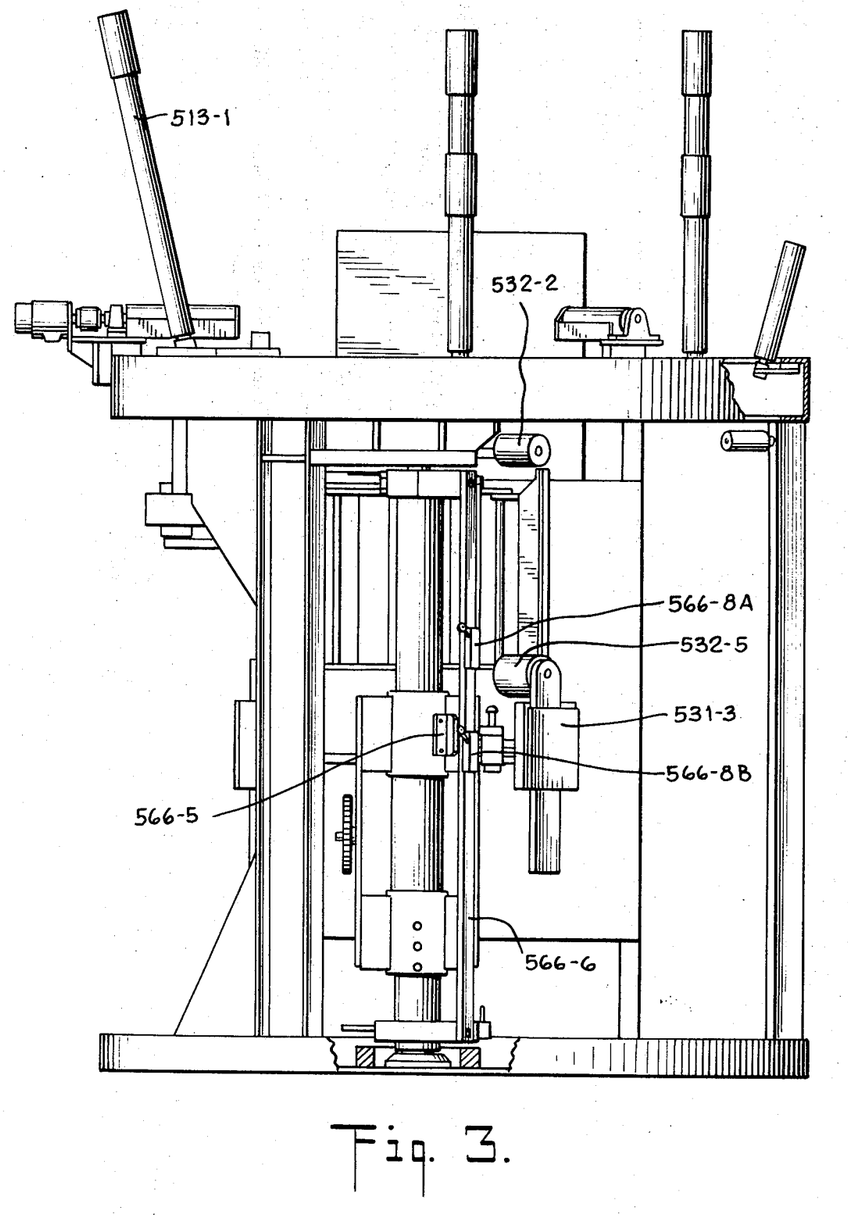

In particular, referring to FIGS. 1 and 2 herein, a coil of randomly wrapped coated tubing is adapted to be supported on a circular frame ring 511–1. The randomly wrapped coil is supported by support rolls 512–1, 512–2 and 512–3. The support rolls 512–1 and 512–2 may be motor driven by motors 512–7 acting through couplings 512–6. The support roll 512–3 may be a non-driven roll. The support rolls 512–1, 512–2, 512–3 are rotatable about horizontal axes and maintain the randomly wrapped coil of tubing above the frame ring 511–1. These rolls permit the coil to rotate within the ring. Additionally, unwardly extending guide rolls 513–1 and 513–10 may be employed to contain the randomly wrapped coil within the ring. The upwardly extending guide rolls are rotatable; some of these guide rolls may be inclined, as are the rolls 513–1.

An end of the randomly wrapped coil of tubing supported within the frame ring 511–1 passes downwardly beneath the plane of the ring in the area designated generally as 10 in FIG. 1. The end of the tubing proceeds from the support roll 512–3 downwardly through the zone 10 and over a further guide roll 578A. The end of the tubing passes between a further pair of guide rolls 578–1, only the upper one of which is shown in FIG. 1. These guide rolls may be driven by a motor 578–1A. The end of the tubing then passes to a bending station 12. The bending station bends the tubing to a desired radius (see FIG. 6). From the bending station, which is a supply station, the tubing passes to a spool assembly 14 where it is wrapped to a uniform coil. The bending of the tubing will now be explained in detail.

TUBE BENDING

FIGS. 6 and 11 to 14 should be referred to together in connection with the following detailed description regarding the bending of the tubing.

Figure 6:
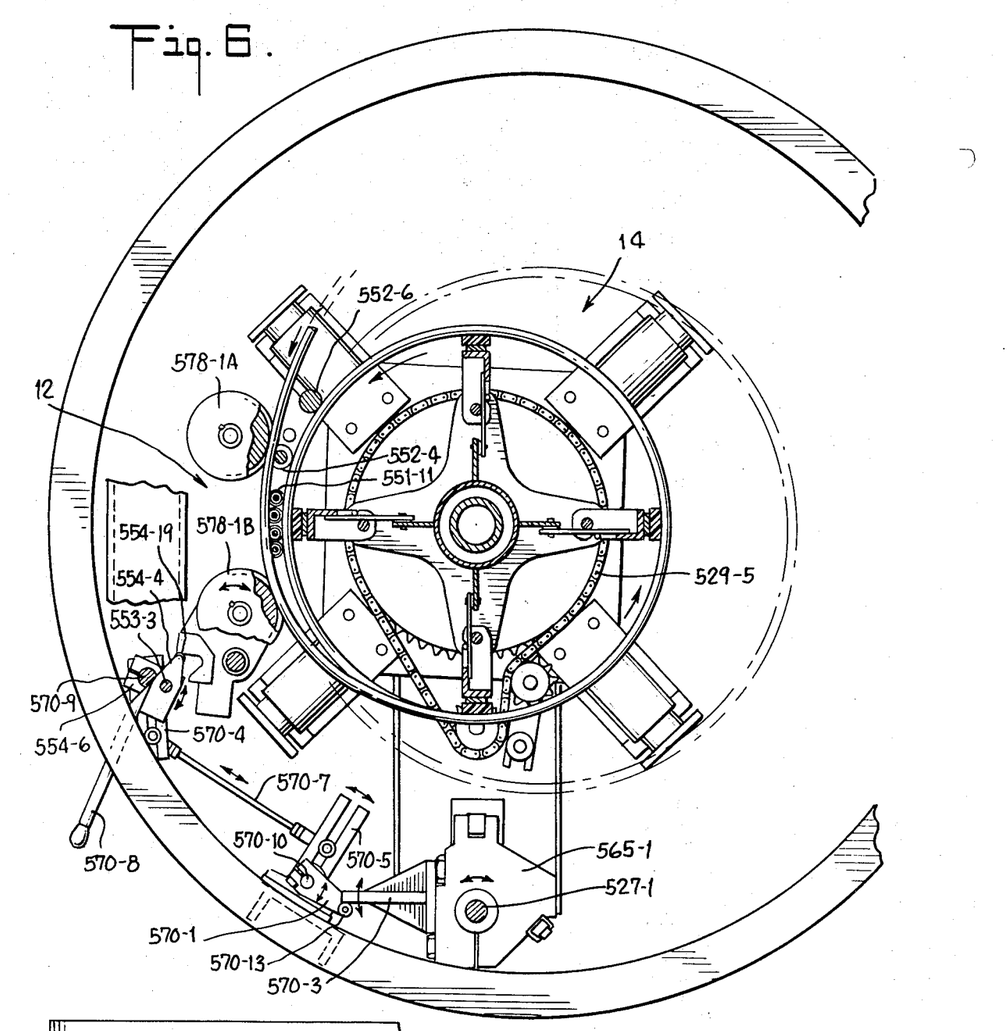
FIG. 6 is a plan view of part of the apparatus, similar to FIG. 1, showing the details of the bending of a strip of material.
Figure 11:
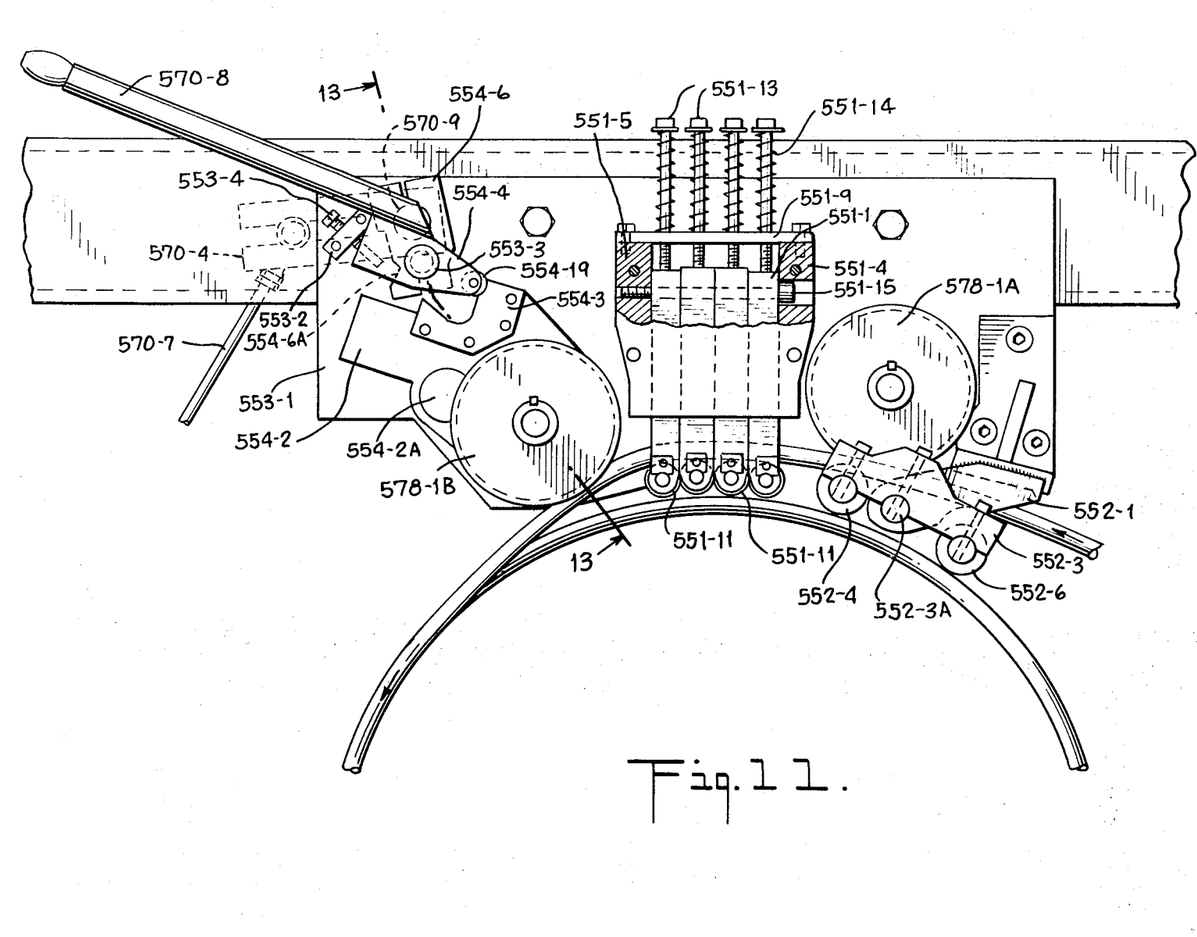
FIG. 11 is a plan view showing the details of the bending roll mechanism.

The tubing passes between rolls 552–4, 552–6 and a roll 578–1A. The roll 578–1A is a first one of two primary bending rolls 578–1A and 578–1B. These two bending rolls advantageously are of the same diameter and both are advantageously driven by motors 554–12. A plurality of other bending rolls 551–11 of lesser diameter are also employed in the bending station. These latter rolls are positioned on the opposite side of the tubing from the bending rolls 578–1A and 578–1B.

The bending rolls 551–11 are carried, as shown in FIG. 11, by holders 551–1 slidable one against another in a holder formed in part from spacers 551–4 and 551–5. The holders 551–1 are terminated in cap screws 551–13 which are threaded into the ends of the holders and which pass through nonthreaded holes in a plate 551–9. Springs 551–14 around the cap screws bias the holders 551–1 so that the bending rolls 551–11 are urged against the tubing in the bending station. The holders are adjusted to suitable positions and then secured in place by tightening a cap screw 551–15, which tightens the holders one against another and to the spacer 551–5. Typically, in setting up the equipment, the holders are adjusted so that the springs are deflected uniformly in turn uniformly distributing the bending pressure exerted by the rolls 551–11 on the tubing. After the holders are locked in position, the springs serve no function; the springs are simply to indicate uniform bending pressure, typically adjusted for maximum bending, i.e., smallest bending radius.

The tube passes from the bending rolls 551–11 and against the bending roll 578–1B, from which it passes to the spool assembly 14 to be coiled thereon.

Referring particularly to FIG. 6, bending roll 578–1A is adapted to be driven about a fixed axis. The bending rolls 551–11 are adjustable, as explained above, within the holders 551–4 and 551–5; however, once adjusted, their positions generally will not be changed. Bending roll 578–1B, on the other hand, is mounted for rotation about an axis which may move. The movement of the bending roll 578–1B is automatically adjusted in accordance with the outside diameter of the coil being formed on the spool assembly 14. As the coil diameter increases, i.e., as succeeding layers of turns are wrapped on the spool, the bending roll 578–1B is automatically moved so as to increase the radius of bending in the bending station 12.

To elaborate, the spool assembly 14, as shown in FIG. 6, rotates as shown by the arrows under the action of a chain drive 529–5. The entire spool assembly is also mounted for pivoting about a pivot shaft 527–1. As the coil builds up on the spool assembly 14 and succeeding layers are formed on the spool, the spool assembly pivots about the pivot shaft 527–1, moving the spool assembly away from the bending station. In this regard it should be noted that the spool assembly is maintained generally biased toward the bending station 12 by the tubing undergoing bending, which tends to pull the spool assembly toward the bending station. The outside turns of the coil bear against the rolls 552–4 and 552–6 only. As the spool assembly 14 moves away from the bending station as succeeding layers are built up on the coil, a mechanical linkage arrangement coupled to the bending roll 578–1B moves that bending roll to increase the radius of bending, as will now be explained.

Figure 7:
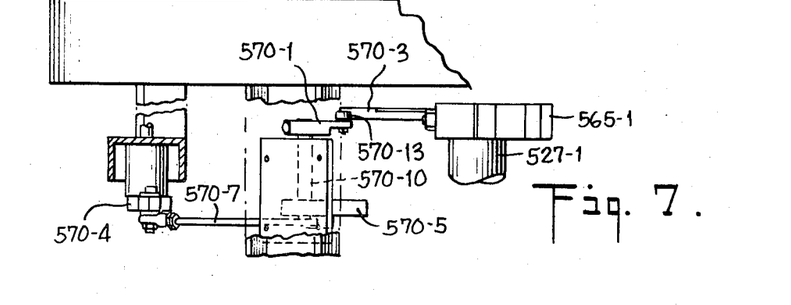
FIG. 7 is a detailed view of part of the mechanism responsible for the automatic adjustment of one of the bending rolls in accordance with coil diameter.
Figure 12:
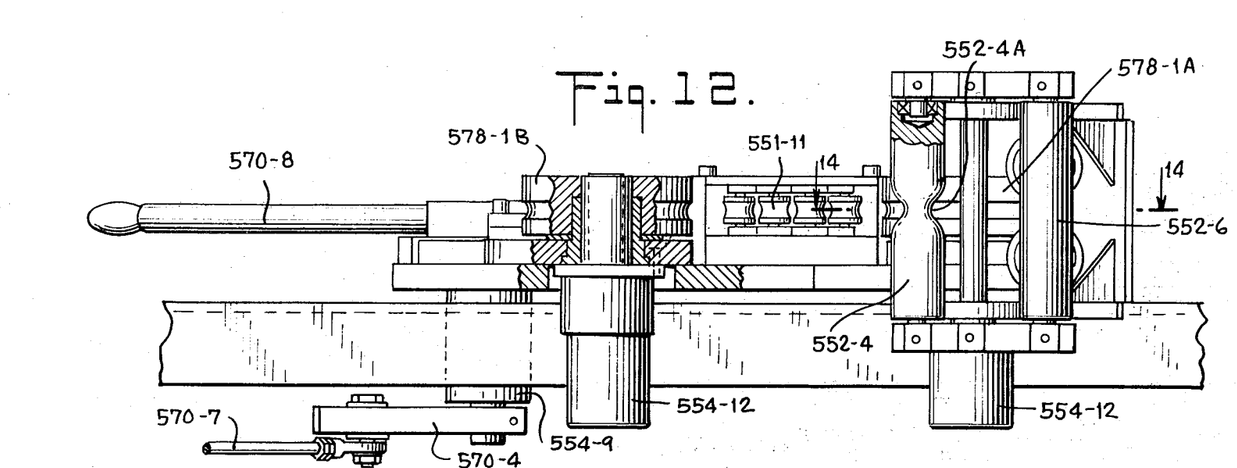
FIG. 12 is a side veiw of the bending roll mechanism shown in FIG. 11.
Figure 13:
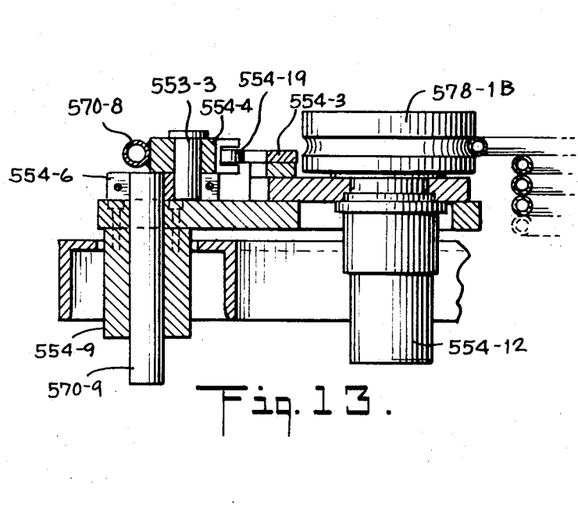
FIG. 13 is a sectional view of the apparatus shown in FIG. 11 looking in the direction of the arrows 13—13 in FIG. 11.
Figure 14:
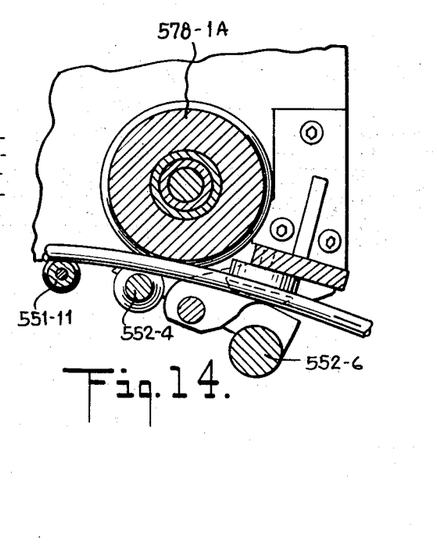
FIG. 14 is a sectional view of the apparatus shown in FIG. 12 looking in the direction of the arrows 14—14.

Referring to FIGS. 6 and 7, the spool assembly includes a lever 570–3 mounted adjacent to the pivot shaft 527–1. As the spool assembly 14 pivots clockwise about the shaft 527–1 as the coil is formed, the lever 570–3 pivots clockwise also. A cam roller 570–13 bears against the lever 570–3 and moves with the lever. The cam roller is mounted on a lever 570–1 which pivots about the axis of a shaft 570–10. The lever and shaft are secured together. The shaft 570–10 has secured thereto another lever 570–5 which pivots about the axis of the shaft 570–10, in this case in a counterclockwise direction. The lever 570–5 carries a draw-bar 570–7 thereon, which moves generally to the left, as viewed in FIG. 6, for counterclockwise movement of the lever 570–5, as just explained. The draw-bar 570–7 is coupled to a further lever 570–4 which is secured to a shaft 570–9. Referring also to FIGS. 12 and 13 as well as to FIG. 6, the shaft 570–9 is secured at its upper end to a crank arm 554–6. The crank arm thus pivots about the axis of the shaft 570–9, in this case in a clockwise direction. Referring now also to FIG. 11, the crank arm 554–6 includes a hinge pin 553–3 which is connected to a lever 554–4. This lever includes a roller 554–19 which bears against a cam 554–3 carried on a base plate 554–2. The base plate also carries the bending roll 578–1B. The base plate pivots about a shaft 554–2A.

As the lever 554–4 pivots generally in clockwise fashion about the shaft 570–9 due to clockwise movement of the crank arm 554–6, as just explained, the roller 554–19 bears against cam 554–3 tending to allow the base plate 554–2 to pivot in a counterclockwise direction about the shaft 554–2A, swinging the bending roll 578–1B away from the coil being formed on the spool. This generally counterclockwise movement of the bending roll 578–1B about the shaft 554–2A increases the radius of bending in the bending station. The radius should be increased as the outside diameter of the coil formed on the spool assembly 14 increases.

In this fashion, the radius of bending at the bending station is automatically adjusted in accordance with coil diameter. The tubing can be coiled on the spool assembly at any suitable rate, which may be varied. Further, the tubing size, i.e. diameter, may change and no adjustment of the linkages providing for movement of the bending roll will be required, as in prior art arrangements where the adjustment of the bending roll was dependent upon speed of coiling, for example.

Referring to FIG. 11, it should be noted that the lever 554–4 carries a handle 570–8. The handle may be manually actuated to swing the roller 554–19 on the lever 554–4 out of engagement with the cam 554–3 to permit manual adjustment of the bending roll 578–1B at the beginning of a bending operation to thread the tubing through the bending station, for example.

It should also be noted that the range of movement of the bending roll 578–1B may be adjusted by suitable adjustment of the draw-bar 570–7 which is in the form of a turnbuckle (FIG. 6). This adjustment should be completed in the process of setting up the apparatus to provide the proper amount of bending roll movement as coil diameter increases. For this purpose a set screw 553–4 (FIG. 11) carried in a block 553–2 that is attached to frame plate 553–1, may be helpful. The set screw may be adjusted to bear against a surface 554–6A forming a part of the crank arm 554–6. The set screw thus limits the clockwise movement of the crank arm and hence the movement of the bending roll 578–1B. The set screw is used generally in initially setting up the apparatus and thereafter may be backed off in the block 553–2 so that it no longer limits the travel of the crank arm 554–6.

It should also be noted that it is necessary to have the small diameter bending rolls 551–11 positioned adjacent to the coil that is formed on the spool assembly 14 rather than large diameter bending rolls. This is because the outer turns on the coil tend to bear against the bending rolls immediately adjacent thereto. In order not to nullify the bending effect at the bending station, it is necessary to have the coil as close as possible to the tubing being bent. This is achieved by making the diameter of the bending rolls 551–11 that are adjacent the coil as small as possible.

To elaborate, the tubing is bent in the bending station 12 to a radius (taken from approximately the axis of rotation of the spool assembly 14) which is less than the radius of the coil layer being formed on the spool assembly. This lesser radius allow some springback of the tubing when the tension applied to the tubing after the coil is completed on the spool assembly is removed. So as not to nullify or reduce the bending, the outer part of the coil should be as close as possible to the bending zone. Ideally, a bending member of no dimension toward the coil would be employed, to permit the outer layer of the coil to be against the tubing being bent. The rollers 551–11 are of such small diameter as to effectively position the outer layer of the coil in the bending zone. The distance of the outer coil layer from the zone effectively does not cause unbending of the bent utbing; the allowable distance, i.e., the allowable diameter of the bending rolls 551–11, is dependent upon the yield point, i.e. the elastic limit of the tubing.

In this connection, the cluster of small bending rolls 551–11 is intended to serve as a third bending roll in the typical cluster of three bending rolls found in the prior art in connection with single layer coil winders. The bending rolls could be replaced by shoes, for example, in applications permitting such construction. Further, a single small diameter roll 551–11 could be employed where the extreme pressure from one roll can be tolerated.

In this regard it should be noted that the rolls 552–4 and 552–6 serve to guide the coil and prevent it from touching the bending rolls 551–11. The rolls 552–4 and 552–6 are carried on a support 552–3 which pivots about an axis 552–3A to permit both rolls to guide the coil. The roll 552–4 is necked in as at 552–4A to allow the coil on the spool to ride as close as possible to the bending station.

TUBE COILING

Figure 4:
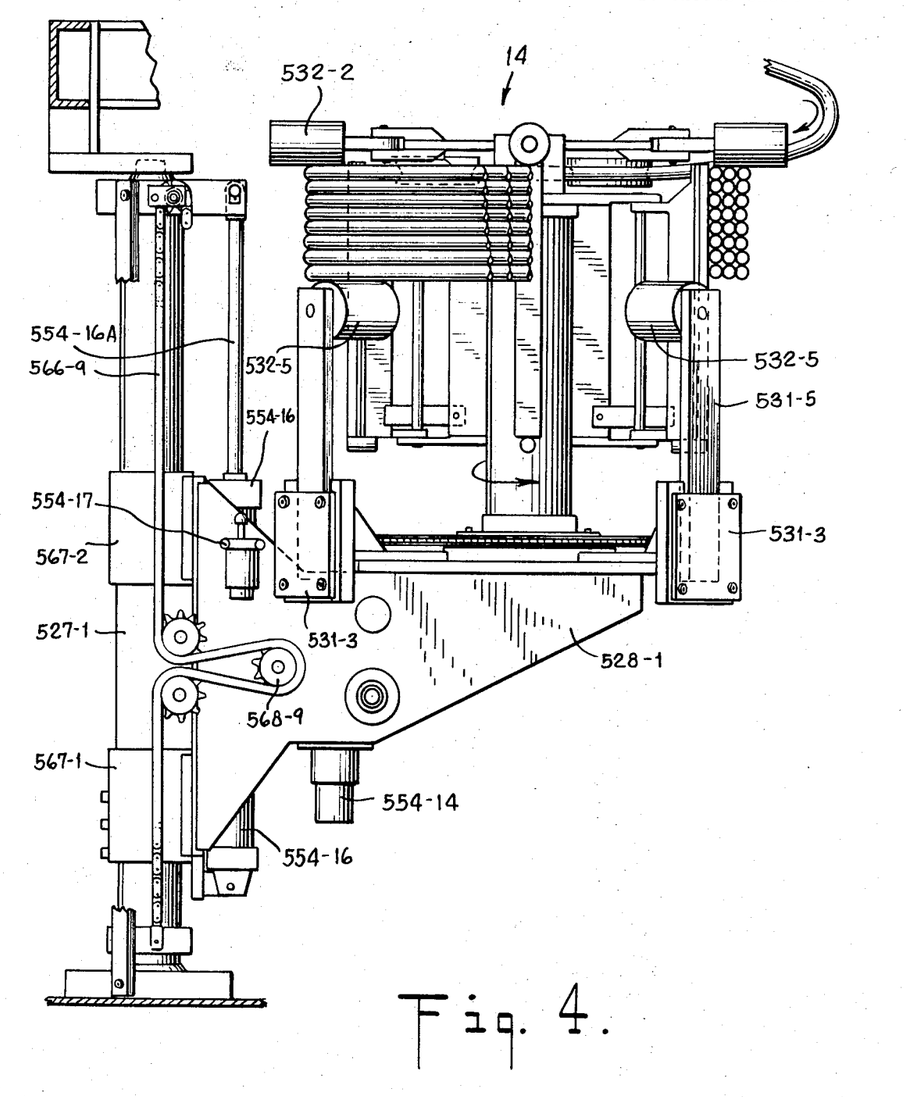
FIGS. 4 and 5 are views from opposite directions of the spool assembly of the apparatus of FIG. 1.
Figure 5:
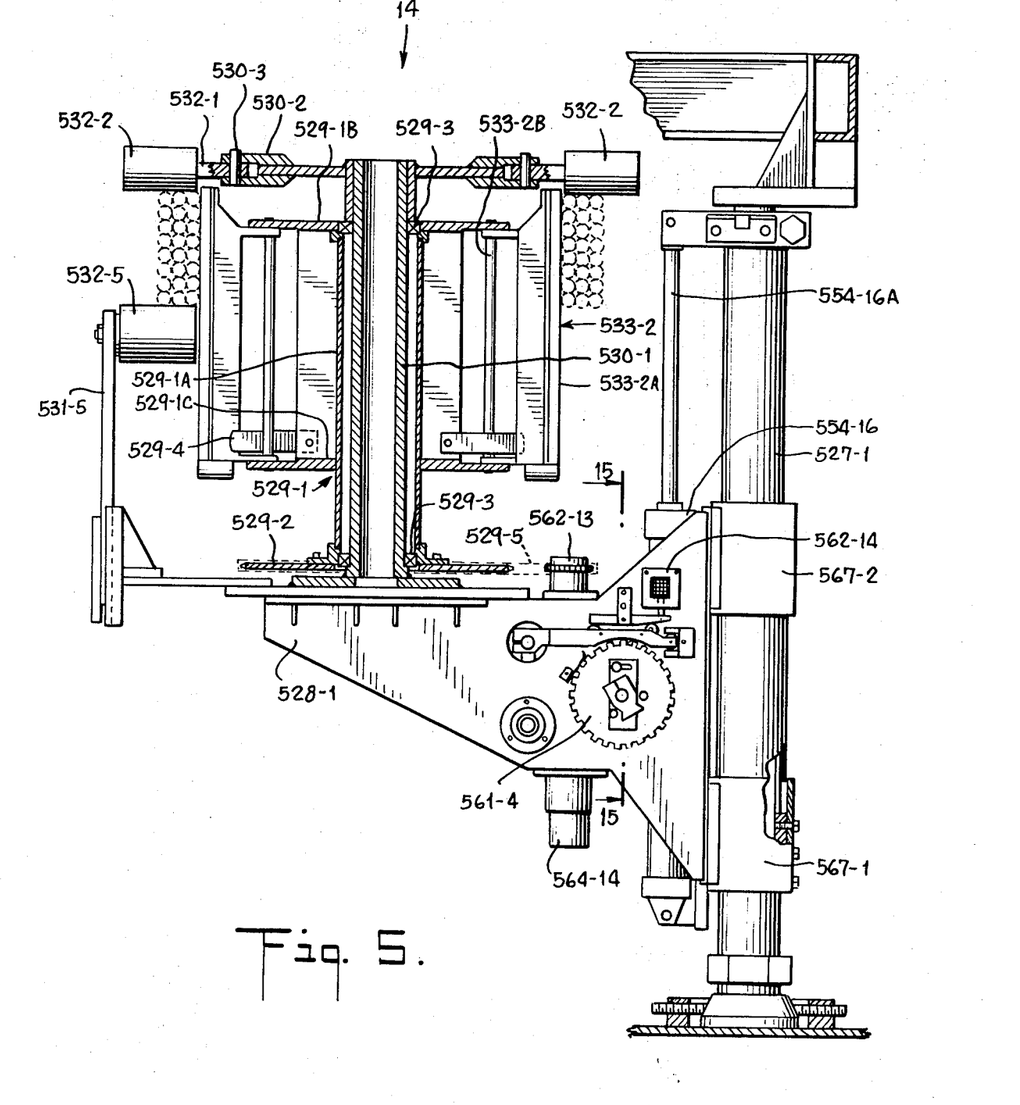

The tubing, after it is bent in the bending station 12, is coiled on the spool asesmbly 14 shown in detail in FIGS. 2 to 5. Referring first to FIG. 5, the spool assembly 14 includes a spool shaft 530–1 mounted on a knee bracket 528–1. Bearings 529–3 permit rotation of a spool 529–1 about the spool shaft 530–1. The spool 529–1 is formed from a cylindrical member 529–1A secured to an upper plate 529–1B and a lower plate 529–1C. Plates 529–1B and 529–1C serve as mounts for a plurality of spool wings 533–2 mounted circumferentially about the spool. The spool wings are formed from L-shaped members 533–2A that include rods 533–2B pivotally secured to the upper plate 529–1B and the lower plate 529–1C. The spool wings 533–2 are maintained in position by latches 529–4 which engage the spool wings. The latches may be pivoted upwardly out of engagement with the spool wings so that the spool wings in turn may be pivoted about the axes of the rods 533–2B. Such pivoting takes place when it is desired to remove a coil of tubing from the spool, the coil being tightly wrapped about and against the spool wings.

At the start of a coiling operation, the free end of the tubing is passed from the bending station 12 and is attached by a suitable clamp (not shown) to one of the spool wings 533–2. Depending upon the vertical position of the spool with respect to the bending station, the free end of the tubing is attached either to the upper portion of one of the spool wings or to the lower portion of the wing. The spool assembly 14 is then rotated under the action of a motor 554–14 which drives the chain 529–5 through a sprocket 562–13. The chain 529–5 engages a sprocket 529–2 secured to the lower portion of the cylindrical member 529–1A of the spool 529–1. The spool is thereby rotated to wind succeeding turns of tubing thereon.

As the spool 529–1 is rotated under the action of the motor 554–14, the bending station 12 and the spool are given relative reciprocation so as to wind the turns along the spool. In this particular embodiment the bending station is fixed, and hence the spool is given a vertical reciprocation. For this purpose the knee bracket 528–1 that carries the spool assembly includes guide housings 567–1 and 567–2, which are free to slide along the pivot shaft 527–1. The guide housings also permit the pivoting of the entire spool assembly about the pivot shaft 527–1 to provide for the movement of the spool assembly away from the bending station 12 as the outside diameter of the coil increases when succeeding layers are wrapped on the coil, all as explained above. Because the spool assembly reciprocate past the bending station, it is necessary to have small diameter bending rolls 551–11, as noted above, to prevent unbending of the tubing. The small diameter rolls permit the outside layer of the coil to be adjacent the tubing undergoing bending while spool reciprocation takes place.

The reciprocation of the spool assembly 14 is automatically controlled, as will be described in more detail below. Presently the spool assembly 14 will be described as to the apparatus defining the longitudinal extent of the coil on the spool.

Referring to FIGS. 2 to 6, the spool assembly includes a plurality of lower guide rolls 532–5 that are mounted on roll elevator slide bars 531–5. These slide bars are in turn clamped in fixed positions with respect to the knee bracket 528–1 by clamps 531–3. The slide bars 531–5 are moved within the clamps 531–3 until the lower guide rolls 532–5 are positioned at a suitable level, and then the slide bars are clamped in position. The lower guide rolls 532–5 support the lowermost turns in the layers of the coil on the spool.

A plurality of upper guide rolls 532–2 is employed to contain the uppermost turns of the coil on the spool 529–1. Each of the upper guide rolls is mounted by a corresponding swivel shaft 532–1 which in turn is coupled to a spool spider 530–2 by a pin 530–3. The spool spiders 530–2 are attached to the uppermost part of the spool shaft 530–1. The upper guide rolls 532–2, like the lower guide rolls 532–5, thus do not rotate with the spool. The upper guide rolls 532–2 may be pivoted about the pins 530–3 so that they may be swung inside the coil after a coil has been completed on the spool 529–1 to permit the coil to be removed from the spool.

It is obvious then that as the spool 529–1 is rotated to wrap succeeding turns of the coil on the spool, the uppermost and lowermost turns in the layers bear respectively against the upper guide rolls 532–2 and lower guide rolls 532–5. The guide rolls, which are free to rotate, do not inhibit the rotation of the spool.

SPOOL RECIPROCATION

As mentioned above, the spool assembly 14 is reciprocated with respect to the bending station 12 so that a uniform coil is wrapped on the spool consisting of succeeding turns which are wrapped one above the other in a layer while the spool is moving downwardly, and one below another in another layer while the spool is moving upwardly.

Referring to FIGS. 4 and 5, the spool assembly 14 is carried by the knee bracket 528–1 which is free to slide upwardly and downwardly along the pivot shaft 527–1. An hydraulic cylinder 554–16 controls the movement of the spool assembly. The hydraulic cylinder is connected to the knee bracket 528–1. Piston rod 554–16A, part of the hydraulic cylinder arrangement, is connected to the framework of the apparatus. As the cylinder acts on the piston, relative movement is occasioned between the piston and cylinder, causing the spool assembly to be raised and lowered.

Figure 8:
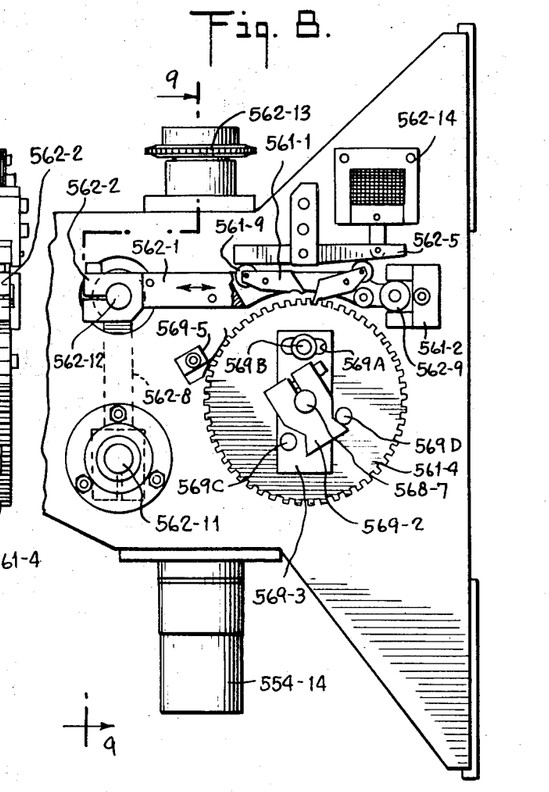
FIG. 8 is a view showing the details of part of the reciprocating drive mechanism of the spool.
Figure 9:
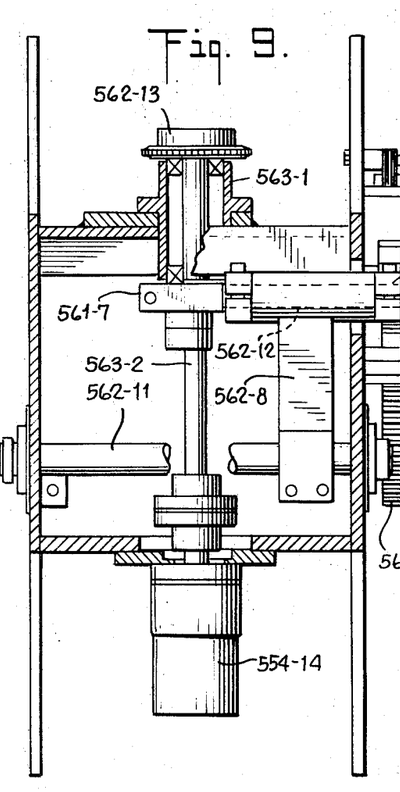
FIG. 9 is a sectional vew of the apparatus shown in FIG. 8 looking in the direction of arrows 9—9 of FIG. 8.
Figure 10:
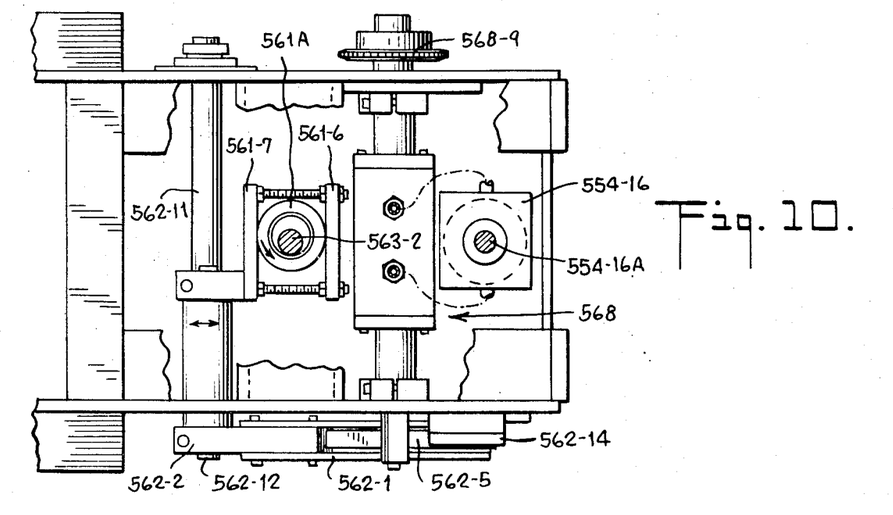
FIG. 10 is a plan view of the apparatus shown in FIG. 8.

The control mechanism for the hydraulic cylinder involves a drive taken from the rotational drive of the spool 529–1. In particular, this drive is shown in FIG. 5 as involving the drive motor 554–14 which drives the sprocket 529–2 of the spool through the sprocket 562–13 and chain 529–5. Referring now to FIG. 9, it will be noted that the drive motor 554–14 drives the sprocket 562–13 through shaft 563–2. From FIG. 10 it will be seen that the shaft 563–2 includes an eccentric arrangement involving an eccentric sleeve 561A coupled to the shaft 563–2. The sleeve is positioned within bar 561–6 and a clamp bracket 561–7. Threaded rods 561–14 maintain the bar and clamp bracket against the eccentric sleeve. As the motor-driven shaft 563–2 rotates, the eccentric arrangement reciprocates back and forth to reciprocate a clamp bar 562–2. The clamp bar 562–2 is attached to an arm 562–8 (FIG. 9) which pivots about a shaft 562–11 to permit the reciprocating movement just described. Side plate structure 562–1 is connected to the clamp bar 562–2 (see FIGS. 8 and 10). The side plate structure includes a roller 562–9 sliding within a guide 561–2, to guide the reciprocating motion of the structure. The side plate structure also carries two pawls 561–1 thereon. Each pawl pivots about an axis and includes a roller 561–9 at an end thereof that bears against a lever 562–5 actuated by solenoid 562–14. Both pawls 561–1 reciprocate back and forth with the side plate structure. Depending upon the energization or deenergization of the solenoid, the lever 562–5 causes either the right-hand one of the pawls or the left-hand one of the pawls to engage the teeth of a ratchet 561–4. In this regard, the pawls 561–1 are gravity-biased to bear against the lever 562–5. In the position of the lever shown in FIG. 8, the right-hand pawl is in position to engage the ratchet 561–4 and to drive the ratchet in a counterclockwise direction as the side plate structure moves from right to left. A spring block 569–5 provides suitable pressure against the ratchet 561–4 so that it does not turn too freely. The ratchet is obviously driven by the pawls in step-type fashion.

Mounted on the ratchet 561–4 is a plate 569–3 which is slotted as at 569A. A bolt 569B is threaded into the ratchet 561–4 through the slot 569A to permit adjustment of the plate 569–3. The plate includes a pin 569C thereon which is spaced from a pin 569D mounted on the ratchet. The spacing of the pins is adjustable by loosening the bolt 569B and moving the plate 569–3. In this regard, the plate pivots about a shaft 568–7 that is connected to a ratchet block 569–2.

As the ratchet 561–4 rotates, one of the pins 569C and 569D contacts the ratchet block 569–2 to cause it to rotate and thus to rotate the shaft 568–7. In particular, for counterclockwise rotation of the ratchet the pin 569C drives the ratchet block; for clockwise rotation of the ratchet the pin 569D drives the ratchet block. It will be noted that when the rotation of the ratchet 561–4 is changed, there is a slight delay between the time at which ratchet rotation is reversed and the time at which the corresponding one of the pins drives the block 569–2.

This delay (provided by the spacing of the pins 569C and 569D) is for the purpose of forming adjacent turns in different layers of the coil next to each other, as explained below in greater detail.

Figures 15, 16:
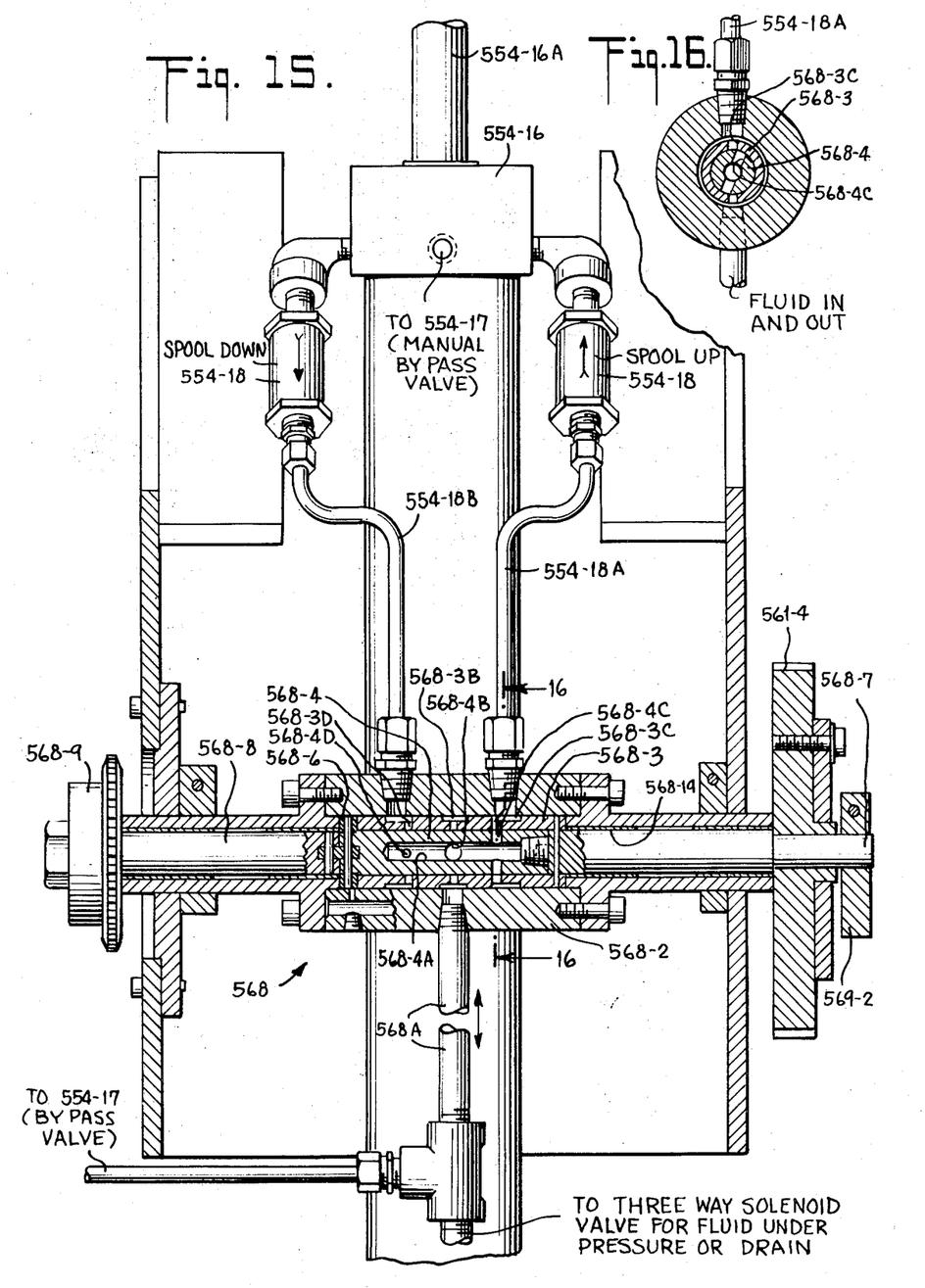
FIG. 15 is a view, partially in section, of the valve mechanism controlling the reciprocating movement of the spool upon which the strip is wound in a coil.
FIG. 16 is a sectional view of the valve mechanism of FIG. 15, looking in the direction of the arrows 16—16.

Referring to FIG. 15, the shaft 568–7, which is rotated by ratchet block 569–2, is mounted within a bushing 568–14. The shaft is pinned to outer sleeve 568–3 of a valve assembly 568. The valve assembly controls the raising and lowering of the spool assembly 14, as will be explained.

In particular, the valve assembly 568 includes valve body 568–2 which mounts inside thereof two concentric sleeves, one of which is the outer sleeve 568–3 and the other of which is an inner sleeve 568–4. The inner and outer sleeves control the communication of fluid through the valve assembly between a conduit 568A and conduits 554–18A and 554–18B. The conduit 554–18A is connected through a check valve 554–18 to an hydraulic cylinder 554–16. The other conduit 554–18B is connected through a similar check valve to the hydraulic cylinder. The check valves pass fluid in the directions shown by the arrows. The right-hand check valve is for the application of fluid under pressure from the conduit 568A into the cylinder 554–16 to cause a relative downward movement of piston rod 554–16A. From FIG. 4 it will be noted that the piston rod 554–16A is connected to the framework of the entire structure, and hence is not movable. Actually it is the cylinder 554–16 which moves, upwardly in this case. The left-hand check valve is for the exhausting of fluid from the cylinder 554–16 through the valve assembly 568 and into the conduit 568A. In this regard, it will be noted that the conduit 568A is connected through a T connection to a conduit designated as leading to a three-way valve (not shown) which either applies fluid under pressure to the conduit or drains fluid from the conduit.

As is noted, the outer sleeve 568–3 is driven by the shaft 568–7. The inner sleeve 568–4 is connected to a shaft 568–8, in turn connected to sprocket 568–9. A bearing 568–6 controls the axial position of the inner sleeve relative to the outer sleeve. As noted from FIG. 4, the sprocket 568–9 engages a chain 566–9. The chain is fixed with respect to the framework of the apparatus. Hence as the spool assembly 14 is raised or lowered the sprocket 568–9 "walks" along the chain, which causes the sprocket to rotate and hence to rotate the inner sleeve 568–4.

The inner sleeve 568–4 includes an interior passage 568–4A and transverse passages 568–4B, 568–4C, and 568–4D. The outer sleeve includes passages 568–3B, 568–3C, and 568–3D. The passages align to pass fluid through the valve. Specifically, fluid under pressure from the conduit 568A fills the passage 568–3B in the outer sleeve and passes through the passage 568–4B, entering into the passage 568–4A in the inner sleeve. The fluid under pressure then flows out of the passage 568–4C in the inner sleeve and out of the passage 568–3C in the outer sleeve (when these last two passages are aligned) and into the conduit 554–18A to provide for movement of the spool assembly upwardly. In similar fashion, when the passage 568–3D in the outer sleeve is aligned with the passage 568–4D in the inner sleeve, fluid flows out of the conduit 554–18B and into the passage 568–4A in the inner sleeve. The fluid then flows through the passage 568–4B in the inner sleeve and through the passage 568–3B in the outer sleeve and into the conduit 568A, in this case to exhaust fluid in the cylinder and to permit the spool assembly 14 to move downwardly.

The passages 568–3C and 568–4C at the right-hand end of the valve assembly (to provide for upward spool movement) cannot be aligned together at the same time that the passages 568–3D and 568–4D at the other end of the valve assembly (to provide for downward spool movement) are aligned together. This is achieved by giving either the passages in the outer sleeve or the passages in the inner sleeve a different angular orientation.

As was indicated above, the spool assembly is driven upwardly and downwardly intermittently in a stepped fashion. This is achieved through the action of the valve assembly 568 as follows:

In particular, it was described that the inner valve sleeve is driven by the sprocket 568–9 which is dependent upon movement of the spool assembly 14 upwardly and downwardly. The outer valve sleeve, on the other hand, is driven by the ratchet block 569–2, in turn driven by the ratchet 561–4. As noted, the ratchet 561–4 is continuously driven as long as the spool assembly 14 is rotated under the action of the motor 554–14. In operation then, the inner valve sleeve 568–4 is continuously rotated (in steps by the action of the pawls 561–1, FIG. 8) as the spool winds tubing thereon. As soon as the passages 568–4C and 568–3C in the inner and outer valve sleeves are aligned, fluid under pressure passes into the cylinder 554–16 causing the spool assembly to be raised. However, movement upwardly of the spool assembly causes a corresponding movement of the inner valve sleeve 568–4. This movement of the inner valve sleeve is sufficient to render nonaligned the passages 568–4C and 568–3C, thereby removing the application of fluid under pressure to the cylinder. Hence the spool assembly 14 stops moving upwardly. The spool assembly 14 remains motionless until once again the passages 568–4C and 568–3C are aligned. Then fluid passes under pressure through the valve assembly into the cylinder 554–6 to raise the spool assembly. In this fashion, the spool assembly is driven intermittently upwardly. The step-like movement is easily timed with the rotation of the spool (by suitable selection of gearing, e.g.) so that for one complete rotation of the spool, completing one turn, the spool is moved upwardly, e.g., one tube diameter for the wrapping of the next turn.

FIG. 16 shows in section the valve assembly 568 and in particular the passages 568–3C and 568–4C. It matters not in which direction rotation of the sleeves takes place. The action is such that as soon as the passages become nonaligned, the continuous movement of the ratchet ultimately renders the passages aligned causing the spool the move, thereby to render the passages nonaligned again.

The same action takes place between the passages 568–3D and 568–4D to provide with the exhausting of fluid from the cylinder 554–16.

The reversal of movement of the spool assembly 14, i.e. either from upwardly to downwardly or from downwardly to upwardly, is controlled by two limit switches 566–8A and 566–8B (FIG. 3), both of which are slidably mounted on a guide 566–6 mounted on the frame of the apparatus. These limit switches are actuated by a plate 566–5 which moves upwardly and downwardly with the spool assembly 14. The limit switches control the solenoid 562–14 shown in FIG. 8 so as to provide for clockwise or counterclockwise rotation of the ratchet 561–4, depending upon whether the solenoid is deenergized or energized.

The limit switches also control the three-way valve (not shown) that determines whether the conduit 568A leading to the valve assembly 568 provides fluid under pressure or is in the draining mode of operation. When the upper limit switch 566–8A is actuated, e.g., causing either energization or deenergization of the solenoid 562–14, as the case may be, the direction of rotation of the ratchet 561–4 is immediately reversed. However, due to the spacing of the pins 569C and 569D in connection with the shape of the ratchet block 569–2, there is a slight delay before the ratchet block changes its direction of rotation. Thus, there is a slight delay between the actuation of the upper limit switch 566–8A and movement of the valve sleeve 568–3 in the reverse direction. This delay in movement maintains the spool in its uppermost position (ordinarily it would commence downward movement after the turn had been completed) so that the next turn is immediately over the preceding turn. This ensures that the adjacent turns on adjacent layers are opposite each other.

The limit switch 566-8B provides for suitable control when the spool has reached its downward position.

These two limit switches obviously determine the longitudinal extent of a coil on the spool, i.e., the number of turns per layer in a coil.

Referring again to FIG. 15, it will be noted that the conduit 568A leading to the valve assembly 568 is also coupled through the T connection to a bypass valve 554-17 (shown in FIG. 4). Also connected to the bypass valve 554-17 is the cylinder 554-16. The bypass valve 554-17 is a manually operated valve designed to bypass the valve assembly 568 and to provide for the raising and lowering of the spool assembly manually at will without requiring the action of the valve 568 as a control.

SUMMARY

A unique coiling assembly has been disclosed. It is suitable for the coiling of strip material on a spool to provide a multi-turn and multi-layer coil. The strip material supplied for coiling may be from a previously wrapped coil, e.g., or may be a straight strip, e.g. The number of turns in a layer can be varied by the positioning of the limit switches 566-8A and 566-8B shown in FIG. 3. The guide rolls 532-5 will also be suitably changed in position to conform to the change in coil length. The coil may be of any convenient diameter. As the outside diameter of the coil increases and the spool assembly pivots about the pivot shaft 527-1, the linkage described change the positioning of the bending roll 578-1B to increase the radius of bending.

Intermittent or step-type movement upwardly and downwardly of the spool assembly 14 is provided during the coiling process. Additionally, the movement is adapted to be halted as the top and bottom turns are produced to ensure that adjacent turns in adjacent layers of the coil are opposite each other. To this end a unique valve assembly driven by spool rotation and upward and downward movement is employed.

When it is desired to remove a wrapped coil from the spool, the spool assembly 14 may be pivoted about the pivot saft 527-1 to gain access to the coil. The spool assembly may be pivoted up to 180° to clear the frame 511-1 of the machine.

The embodiments of the invention disclosed are intended to be representative. The claims should be taken to define the invention.

What is claimed is:

1. Coiling apparatus, including a spool, a bending station for bending a strip of material as it passes through the station to be subsequently coiled on the spool, the bending station comprising first means for bearing against one side of the strip as it passes through the station, and second means for bearing against the other side of the strip as it passes through the station, the first and second means together bending thee strip to a desired radius, the second means being positioned on the same side of the strip as the spool and having a dimension in a direction toward the spool which is substantially small so that as the coil is wound on the spool the turns in the outer layer are closely adjacent to the strip portion being bent thereby substantially not to unbend the strip after it is bent in the bending station.

2. Coiling apparatus as defined in claim 1, including means for mounting a randomly coiled strip of material above the bending station to be supplied to the bending station, thence to be wound uniformly upon the spool, including support rolls for supporting the randomly coiled strip above the bending station, some of the rolls being driven, and including guide rolls to guide the strip to the bending station.

3. Coiling apparatus as defined in claim 1, wherein the spool is pivotable about an axis to be swung clear of the framework to gain access to the spool and to the bending station.

4. Coiling apparatus as defined in claim 1, wherein the spool is mounted by means of a mount which slides on a column to provide for reciprocating movement of the spool with respect to the bending station, and wherein the mount pivots about the column to provide for movement of the spool toward and away from the bending station.

5. Coiling apparatus as defined in claim 1, wherein the spool is formed with wings about the periphery thereof to define the inner diameter of the coil, and wherein the wings are pivotable to permit them to be swung away from the coil to permit the coil to be easily removed from the spool.

6. Coiling apparatus as defined in claim 1, suitable for winding a multi-layer coil of a ductile material having a high modulus of elasticity, wherein the radius of bending provided by the first and second means is less than the radius of the turn thereafter produced in the coil so that the coil is composed of tightly wrapped turns which do not spring outwardly after tension is removed from the strip, and wherein the dimension of the second means in the direction toward the spool is chosen in accordance with the elastic limit or yield point so that the strip is not substantially unbent to loosen the turn on the coil.

7. Coiling apparatus as defined in claim 1, wherein the first means comprises first and second bending rolls and the second means comprises a first plurality of bending rolls positioned substantially between the first and second bending rolls, the diameters of the bending rolls of the first plurality being substantially less than the diameters of the first and second bending rolls.

8. Coiling apparatus as defined in claim 7, wherein the first plurality of bending rolls are slidably mounted toward and away from the spool upon which the strip is coiled, and means for fixing the bending rolls of the first plurality in selected positions.

9. Coiling apparatus as defined in claim 7, wherein one of the first and second bending rolls is movable in position to vary the radius of bending of the strip in the bending station.

10. Coiling apparatus as defined in claim 9, including means responsive to the outer diameter of the coil on the spool for moving the movable bending roll to increase the radius of bending as said outer diameter increases.

11. Coiling apparatus as defined in claim 1, wherein the bending station and the spool are relatively reciprocated so as to provide a plurality of turns in each layer of a multi-layer coil on the spool.

12. Coiling apparatus as defined in claim 11, including means for halting the relative reciprocating movement of the spool and bending station as the top and bottom turns of one layer of the coil are formed respectively adjacent the top and bottom turns of the next inner layer.

13. Coiling apparatus as defined in claim 11, wherein the relative reciprocation between the spool and bending station is intermittent.

14. Coiling apparatus as defined in claim 13, wherein means are provided for causing said intermittent relative movement, which means comprises a fluid operated cylinder and piston mechanism, the supply of fluid under pressure to the cylinder causing relative movement between piston and cylinder in one direction and the withdrawal of fluid from the cylinder causing relative movement between the piston and cylinder in the opposite direction, the cylinder and piston mechanism being connected to either the spool or bending station so that relative movement between cylinder and piston causes corresponding relative movement between spool and bending station, a valve mechanism for supplying fluid to and withdrawing fluid from the cylinder, said valve mechanism comprising first and second sleeves, the sleeves having passages therein which when aligned pass fluid through the sleeves to communicate the cylinder with a fluid supply and discharge conduit, means for moving one of the sleeves as strip material is coiled upon the spool, and means for moving the other one of the sleeves in accordance with the relative movement between the spool and the bending station, whereby the passages in the sleeves are intermittently aligned and then nonaligned so as to provide for the intermittent communication of the cylinder through the sleeves with the fluid supply and discharge conduit.

15. Coiling apparatus as defined in claim 11, including means for providing said relative reciprocation between the spool and bending station comprising a pawl and ratchet mechanism, the pawl driving the ratchet in either of two opposite directions, the ratchet including a pair of spaced pins, a driven member between the pins and engaged by one of the pins when the ratchet is driven in one direction to provide for relative movement between the spool and bending station in a first direction, the driven member being engaged by the other of the pins when the ratchet is driven in the opposite direction to provide for such relative movement between spool and bending station in a direction opposite from the first direction, the distance between the spaced pins permitting the driven member to remain stationary for a time when the driving of the driven member is transferred from one pin to the other pin.

16. Coiling apparatus as defined in claim 15, wherein the spool is driven by a drive motor, and including an eccentric driven by the drive motor coupled to the pawl for reciprocating the pawl thereby to drive the ratchet.

17. Coiling apparatus as defined in claim 1, including guide rolls adjustable with respect to the spool to limit the longitudinal extent of the coil being formed on the spool.

18. Coiling apparatus as defined in claim 17, wherein the giude rolls include upper rolls positioned adjacent the upper portion of the spool to limit the upper longitudinal extent of the coil being formed, the upper rolls being pivotable about axes to swing them inside the coil to permit the coil to be removed from the spool.

19. In apparatus for coiling a strip of material, the combination of a bending station for bending the strip to a desired radius, a spool upon which successive layers of a coil are to be wrapped and to which the strip is supplied from the bending station, means mounting the spool and bending station for relative movement toward and away from each other and means responsive to the relative movement of the spool and the bending station away from each other as successive layers of the coil are completed for adjusting the bending of the strip at the bending station.

20. Apparatus as defined in claim 19, wherein the adjustment means comprises a bending roll at the bending station movable in position so as to vary the bending of the strip.

21. The method of coiling strip material in multilayers, comprising bending the strip for coiling, the bending of the strip being varied so as to increase the radius of bending as the outer diameter of the coil increases as the layers are added to the coil, coiling the strip after it is bent, and supporting the coil as it is formed with the outer turns in the coil as formed passing substantially through the area of bending so as to minimize any nullification of the bending as the coil is form.

References Cited
UNITED STATES PATENTS

| | | | |
|---|---|---|---|
| 928,073 | 7/1909 | Schneider | 72—138X |
| 2,246,840 | 6/1941 | Crane et al. | 72—170X |
| 2,349,828 | 5/1944 | Moray | 72—138X |
| 2,919,867 | 1/1960 | Nelson | 72—166X |
| 3,237,875 | 3/1966 | Van der Hoek et al. | 242—7.13 |
| 3,444,716 | 5/1969 | Martin | 72—166X |

MILTON S. MEHR, Primary Examiner

U.S. Cl. X.R.

72—170; 242—78